US007929863B2

(12) United States Patent
Yu

(10) Patent No.: US 7,929,863 B2
(45) Date of Patent: Apr. 19, 2011

(54) REMOTE CONTROLLING SYSTEM USING OPTICAL FIBER

(75) Inventor: Wen-Ping Yu, Chung Ho (TW)

(73) Assignee: Amtran Technology Co., Ltd., Chung Ho, Taipei County (TW)

( * ) Notice: Subject to any disclaimer, the term of this patent is extended or adjusted under 35 U.S.C. 154(b) by 655 days.

(21) Appl. No.: 12/007,459

(22) Filed: Jan. 10, 2008

(65) Prior Publication Data

US 2009/0142063 A1 Jun. 4, 2009

(30) Foreign Application Priority Data

Nov. 30, 2007 (TW) ............................... 96145511 A

(51) Int. Cl.
*H04B 10/00* (2006.01)

(52) U.S. Cl. ......................... 398/113; 398/110; 398/109

(58) Field of Classification Search .................. 398/106, 398/113, 110, 109, 107, 108, 139, 138, 135
See application file for complete search history.

(56) References Cited

U.S. PATENT DOCUMENTS 4,621,374 A * 11/1986 Micic et al. .................. 398/106
5,677,895 A * 10/1997 Mankovitz ...................... 368/10

* cited by examiner

*Primary Examiner* — M. R. Sedighian
(74) *Attorney, Agent, or Firm* — Tim Tingkang Xia; Morris, Manning & Martin, LLP

(57) ABSTRACT

The present invention provides a remote controlling system using an optical fiber. The remote controlling system is for controlling N electronic equipments located in a situation. The remote controlling system according to the invention includes a receiving unit and a transmitting unit. A radiation signal receiver of the receiving unit is for receiving a first radiation signal. According to the first radiation signal, a first controlling module of the receiving unit is for driving a light-emitting device to emit a control light signal to the optical fiber. The control light signal is transmitted over the optical fiber and then received by a photo-detector of the transmitting unit. According to the received control light signal, a second controlling module of the transmitting unit is for driving M radiation signal transmitters to emit M second radiation signals, so as to control one of the N electronic equipments.

5 Claims, 4 Drawing Sheets

REMOTE CONTROLLING SYSTEM USING OPTICAL FIBER

BACKGROUND OF THE INVENTION

1. Field of the Invention

This present invention relates to a remote controlling system and, more particularly, to a remote controlling system using an optical fiber.

2. Description of the Prior Art

In recent years, since multimedia entertainment has been regarded as the No. 1 application in digital home and hot sales of various digital audio/video household appliances (e.g. VCD/DVD players and KALA-OK players), how to share and manage the household appliances in a digital home has become an urgent issue.

Please refer to FIG. 1. FIG. 1 is a schematic diagram of the operation relation between a digital audio/video household appliance 2 (e.g. a VCD/DVD player) and display equipment 1 in the prior art. Generally, the digital audio/video household appliance 2 is set near the display equipment 1 (e.g. a TV) and connected to the display equipment 1 via an audio/video signal cable. If a user desires to have the digital audio/video household appliance 2 perform certain functions (e.g. SPEED UP or PAUSE), the user can control a radiation-based signal receiver 20 of the digital audio/video household appliance 2 via a remote controller 3 so that the functions are carried out. Sometimes, the user even has to move closer to the digital audio/video household appliance 2 to control it more effectively. However, with the emphasis on increasing the quality of life and the population of the concept of interior design, the digital audio/video household appliance 2 is not necessarily set near the display equipment 1. Instead, the digital audio/video household appliance 2 may be set at certain location in the house for centralized management, e.g. a room for the digital audio/video household appliance 2. In view of this, a satisfactory remote controlling system is unquestionably required for the users to remotely control the digital audio/video household appliance 2.

SUMMARY OF THE INVENTION

One scope of the invention is to provide a remote controlling system, which uses an optical fiber including a core with a first facet and a second facet, for controlling N electronic equipments located in a situation, where N is a positive integer. Each of the N electronic equipments comprises a respective first radiation-based signal receiver.

According to an embodiment of the invention, the remote controlling system includes a receiving unit and a transmitting unit. The receiving unit includes a second radiation-based signal receiver, a light-emitting device, and a first controlling module. The transmitting unit includes a photo-detector, M radiation-based signal transmitters, and a second controlling module.

The second radiation-based signal receiver is for receiving a first radiation signal. The light-emitting device is optically coupled to the first facet of the optical fiber. The first controlling module is electrically coupled to the second radiation-based signal receiver and the light-emitting device, respectively. The first controlling module is for driving, according to the first radiation signal, the light-emitting device to emit a control light signal into the first facet of the optical fibers and the control light signal is then transmitted over the optical fiber.

The photo-detector is optically coupled to the second facet of the optical fiber and is for receiving the control light signal transmitted over the optical fiber. M radiation-based signal transmitters are disposed so as to cover the N radiation-based signal receivers in radiation, wherein M is a positive integer. The second controlling module is electrically coupled to the photo-detector and the M radiation-based signal transmitters, respectively. The second controlling module is for driving, according to the control light signal, the M radiation-based signal transmitters to emit M second radiation signals, so as to control one of the N electronic equipments.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
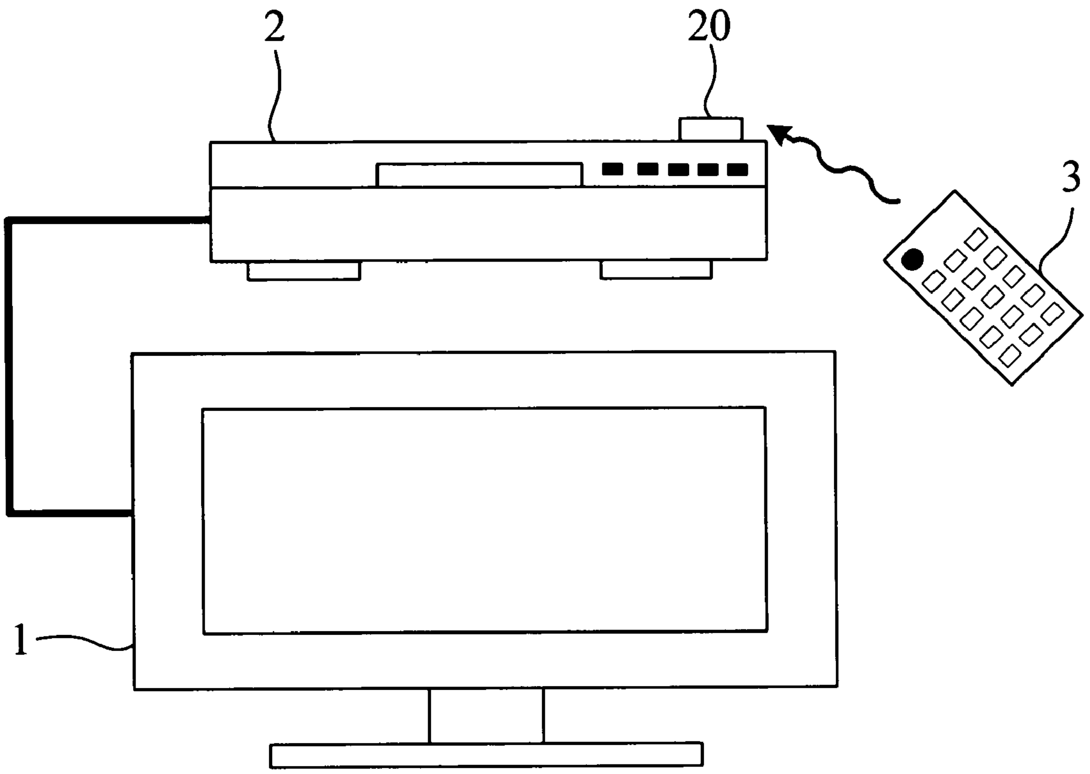
FIG. 1 (prior art)
FIG. 1 is a schematic diagram of the operation relation between a digital audio/video household appliance and display equipment in the prior art.
Figure 2:
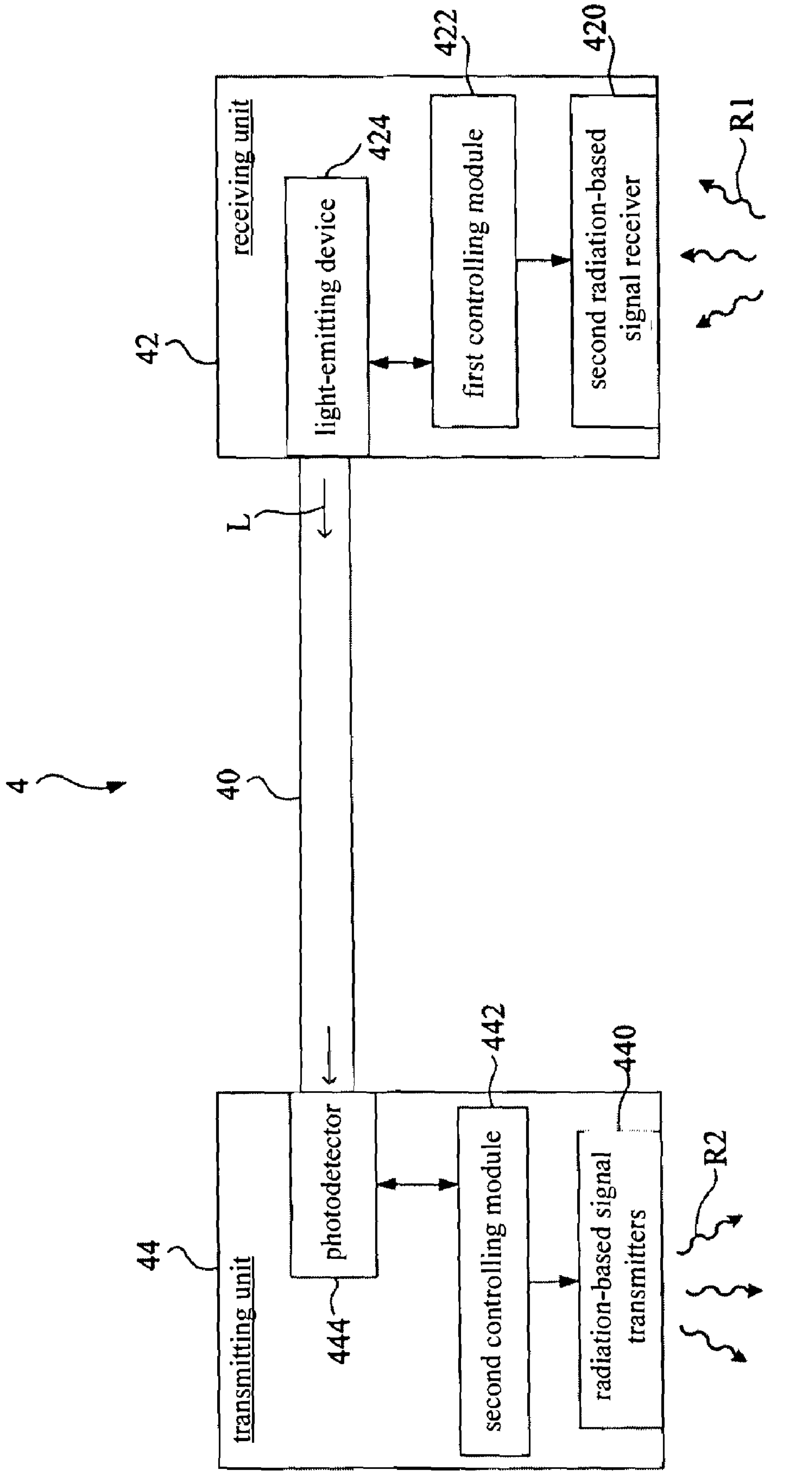
FIG. 2 is a function block diagram of a remote controlling system according to the invention.

Please refer to FIG. 2. FIG. 2 is a function block diagram of a remote controlling system 4 according to the invention. As shown in FIG. 2, the remote controlling system 4 includes an optical fiber 40, a receiving unit 42 and a transmitting unit 44. The optical fiber 40 includes a core (not shown in FIG. 2) with a first facet and a second facet.

The remote controlling system 4 is for controlling N electronic equipments located in a situation (e.g. a house or an office), where N is a positive integer. The N electronic equipments can include a recorder (e.g. a VCD/DVD player), a TV, a projector, an air conditioner, a computer and other electronic equipments. Each of the N electronic equipments can include a respective first radiation-based signal receiver. The first radiation-based signal receiver can receive a radiation signal emitted from a remote controller of certain electronic equipment, and then the electronic equipment reacts to the radiation signal correspondingly.

The receiving unit 42 includes a second radiation-based signal receiver 420, a first controlling module 422 and a light-emitting device 424. The second radiation-based signal receiver 420 is for receiving a first radiation signal R1. As mentioned above, the first radiation signal R1 can be emitted from a remote controller of one of the N electronic equipments. In practical applications, the receiving unit 42 can be embedded in a display system. For example, the display system can be a CRT-based TV or a flat-panel TV, but not limited therein.

In one embodiment, each first radiation-based signal receiver or the second radiation-based signal receiver 420 can be an infrared receiver. Thus, the first radiation signal R1 can be an infrared signal.

In another embodiment, each first radiation-based signal receiver or the second radiation-based signal receiver 420 can be a radio-frequency receiver. Thus, the first radiation signal R1 can be a radio-frequency signal.

The light-emitting device 424 is optically coupled to the first facet of the optical fiber 40. The first controlling module 422 is electrically coupled to the second radiation-based signal receiver 420 and the light-emitting device 424, respectively. The first controlling module 422 is for driving, according to the first radiation signal R1, the light-emitting device 424 to emit a control light signal L into the first facet of the optical fiber 40, and the control light signal L is then transmitted over the optical fiber 40.

The transmitting unit 44 includes M radiation-based signal transmitters 440, a second controlling module 442, and a photo-detector 444. The second controlling module 442 is electrically coupled to the photo-detector 444 and the M radiation-based signal transmitters 440, respectively. The photo-detector 444 is optically coupled to the second facet of the optical fiber 40 and is for receiving the control light signal L transmitted over the optical fiber 40. The M radiation-based signal transmitters 440 are disposed so as to cover the N first radiation-based signal receivers in radiation, wherein M is a positive integer. In other words, the number of M can be chosen according to the number and the distribution of the N first radiation-based signal receivers.

In practical applications, the transmitting unit 44 can be embedded in an optical information reproducing system or an image capturing system. For example, the optical information reproducing system can be a VCD/DVD player, and the image capturing system can be a monitoring system, but not limited therein. In addition, the transmitting unit 44 can be disposed independently outside the N electronic equipments to be controlled, and can utilize the M radiation-based signal transmitters 440 to cover the N first radiation-based signal receivers in radiation, which succeeds in controlling the N electronic equipments.

If each first radiation-based signal receiver or the second radiation-based signal receiver 420 is an infrared receiver, correspondingly, each of the M radiation-based signal transmitters 440 can be an infrared transmitter. Similarly, if each first radiation-based signal receiver or the second radiation-based signal receiver 420 is a radio-frequency receiver, correspondingly, each of the M radiation-based signal transmitters 440 can be a radio-frequency transmitter.

The second controlling module 442 is for driving, according to the control light signal L, the M radiation-based signal transmitters 440 to emit M second radiation signals R2 to control one of the N electronic equipments. Each second radiation signal R2 can be an infrared signal or a radio-frequency signal.

Figure 3:
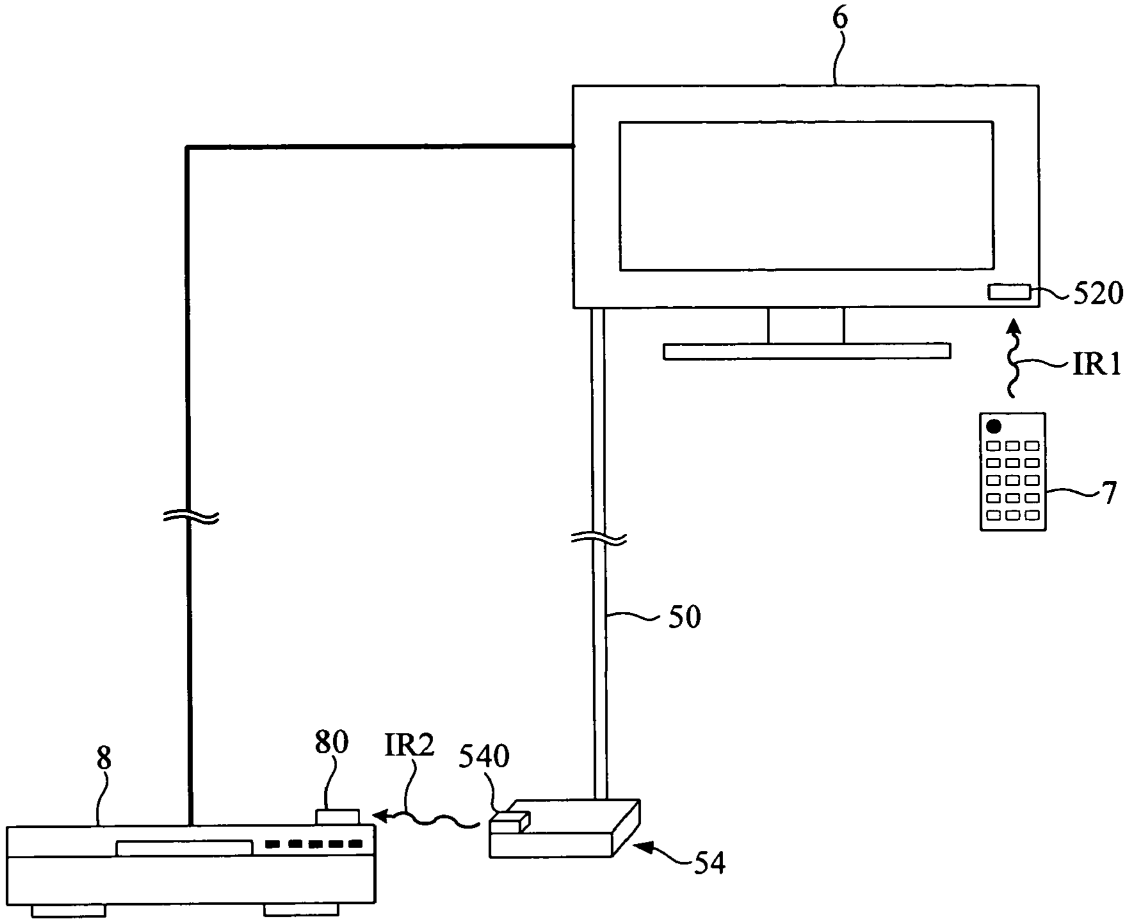
FIG. 3 is a schematic diagram of a remote controlling system in a first embodiment of the invention.

Please refer to FIG. 3. FIG. 3 is a schematic diagram of a remote controlling system in a first embodiment of the invention. As shown in FIG. 3, the remote controlling system is for controlling a VCD/DVD player 8 which includes a first infrared receiver 80.

According to the remote controlling system in an embodiment of the invention, the receiving unit is embedded in a flat-panel TV 6. A second infrared receiver 520 of the receiving unit can be exposed on the flat-panel TV 6. The second infrared receiver 520 is for receiving a first infrared signal IR1 emitted from a remote controller 7 of the VCD/DVD player 8. For example, the first infrared signal IR1 can refer to commands, e.g. PAUSE, STOP or SPEED UP, related to the VCD/DVD player 8. The VCD/DVD player 8 can be connected to the flat-panel TV 6 via an optical fiber 50.

According to the first infrared signal IR1, the first controlling module of the receiving unit is for driving the light-emitting device to emit a control light signal into the optical fiber 50. The control light signal is then transmitted over the optical fiber 50 and to the transmitting unit 54 of the remote controlling system. As shown in FIG. 3, the transmitting unit 54 can be implanted as a circuit box including an infrared transmitter 540. In practical applications, the transmitting unit 54 can also be embedded in the VCD/DVD player 8.

The photo-detector of the transmitting unit 54 is for receiving the control light signal transmitted over the optical fiber 50. The second controlling module of the transmitting unit 54 is for driving, according to the control light signal, the infrared transmitter 540 to emit a second infrared signal IR2. The first infrared receiver 80 of the VCD/DVD player 8 can receive the second infrared signal IR2. Thereby, the VCD/DVD player 8 will react to the second infrared signal IR2 correspondingly. Afterwards, an operation signal corresponding to the reaction can be transmitted to the flat-panel TV 6 via a signal cable, so the reaction, e.g. the foregoing PAUSE, STOP or SPEED UP, can be displayed on the flat-panel TV 6. In practical applications, the signal cable can be an optical fiber-based cable or a high-definition multimedia interface (HDMI) cable, but not limited therein. An HDMI cable can be utilized for a short-distance transmission in consideration of cost. But for a long-distance transmission, an optical fiber-based cable can be utilized to maintain the transmission quality by using the advantages of low signal loss and wide band thereof.

Figure 4:
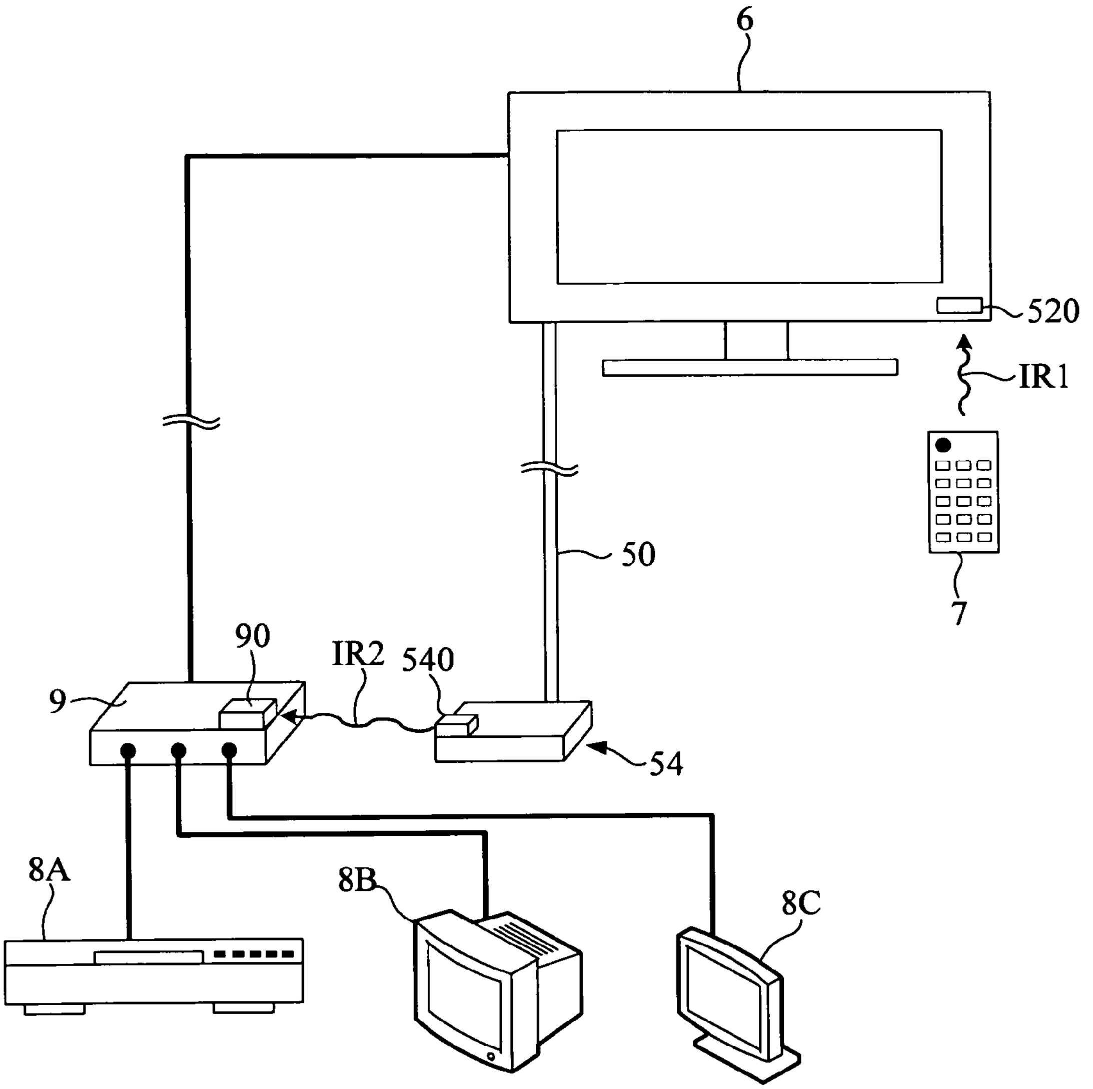
FIG. 4 is a schematic diagram of a remote controlling system in a second embodiment of the invention.

Please refer to FIG. 4. FIG. 4 is a schematic diagram of a remote controlling system in a second embodiment of the invention. As shown in FIG. 4, the remote controlling system is for controlling a VCD/DVD player 8A, a TV 8B, and a computer monitor 8C. The VCD/DVD player 8A, the TV 8B, and the computer monitor 8C can be coupled to a switch apparatus 9 including a first infrared receiver 90.

Therefore, according to the control light signal, the infrared transmitter 540 of the transmitting unit 54 is driven to emit a second infrared signal IR2, and the first infrared receiver 90 of the switch apparatus 9 can receive the second infrared signal IR2. Thereby, the switch apparatus 9 can control one of the VCD/DVD player 8A, the TV 8B, and the computer monitor 8C, such that a reaction corresponding to the second infrared signal IR2 can be generated.

Because an infrared transmitter is directive, if the N electronic equipments have their respective infrared receivers, it depends on whether multiple infrared transmitters may be employed to cover the N infrared receivers in radiation to control the N electronic equipments. For example, it depends on the quantity or distribution of the N infrared receivers.

In another embodiment, the first infrared receiver (80 or 90) and the second infrared receiver 520 can be replaced with a first radio-frequency receiver and a second radio-frequency receiver, respectively. The infrared transmitter 540 can be replaced with a radio-frequency transmitter.

In addition to the remote control of household electronic equipments, the remote controlling system according to the invention can also be applied to a monitoring system. The receiving unit of the remote controlling system can be disposed at a controlling station, and the transmitting unit can be implemented in a camera within a certain distance. By using the advantages of low signal loss and wide band, users can control the camera (e.g. rotating the lens of the camera) through a fiber to effectively fulfill an optimum real-time monitor at its best.

Compared to the prior art, the remote controlling system according to the invention can use an optical fiber to control electronic equipments located in a situation where may be far from the user. Thereby, the electronic equipments can be arranged well to utilize the space of the situation and further promote the life quality adequately.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A remote controlling system, which uses an optical fiber comprising a core with a first facet and a second facet, for controlling N electronic equipments located in a situation by a remote controller, N being a positive integer >1, each of the N electronic equipments comprising a respective first radiation-based signal receiver, said remote controlling system comprising:

a receiving unit, comprising:

a second radiation-based signal receiver, for receiving a first radiation signal from the remote controller;

a light-emitting device, optically coupled to the first facet of the optical fiber; and a first controlling module, electrically coupled to the second radiation-based signal receiver and the light-emitting device, respectively, for driving, according to the first radiation signal, the light-emitting device to emit a control light signal into the first facet of the optical fiber, the control light signal being then transmitted over the optical fiber; and a transmitting unit, comprising:

a photodetector, optically coupled to the second facet of the optical fiber, for receiving the control light signal transmitted over the optical fiber from the receiving unit;

M radiation-based signal transmitters, disposed so as to cover the N first radiation-based signal receivers in radiation, M being a positive integer >1; and a second controlling module, electrically coupled to the photodetector and the M radiation-based signal transmitters, respectively, for driving, according to the received control light signal, the M radiation-based signal transmitters to emit M second radiation signals to control one of the N electronic equipments.

2. The remote controlling system of claim 1, wherein each of the N first radiation-based signal receivers and the second radiation-based signal receiver is an infrared receiver, each of the M radiation-based signal transmitters is an infrared transmitter, and each of the first radiation signal and the M second radiation signals is an infrared signal.

3. The remote controlling system of claim 1, wherein each of the N first radiation-based signal receivers and the second radiation-based signal receiver is a radio frequency receiver, each of the M radiation-based signal transmitters is a radio frequency transmitter, and each of the first radiation signal and the M second radiation signals is a radio frequency signal.

4. The remote controlling system of claim 1, wherein the receiving unit is embedded in a display system.

5. The remote controlling system of claim 1, wherein the transmitting unit is embedded in an optical information reproducing system or an image capturing system.

* * * * *